US010846949B2

(12) United States Patent
Seo et al.

(10) Patent No.: US 10,846,949 B2
(45) Date of Patent: Nov. 24, 2020

(54) APPARATUS FOR CONTROLLING PARKING OF VEHICLE, SYSTEM HAVING THE SAME, AND METHOD THEREOF

(71) Applicants: HYUNDAI MOTOR COMPANY, Seoul (KR); KIA MOTORS CORPORATION, Seoul (KR)

(72) Inventors: Gil Won Seo, Hwaseong-si (KR); Dong Hae Kim, Jeonju-si (KR); Jong Ho Park, Incheon (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 93 days.

(21) Appl. No.: 16/189,090

(22) Filed: Nov. 13, 2018

(65) Prior Publication Data

US 2020/0074759 A1 Mar. 5, 2020

(30) Foreign Application Priority Data

Aug. 28, 2018 (KR) .................. 10-2018-0101227

(51) Int. Cl.
| | |
|---|---|
| *G07C 5/00* | (2006.01) |
| *G05D 1/00* | (2006.01) |
| *B60W 30/06* | (2006.01) |
| *B62D 15/02* | (2006.01) |
| *G01S 17/931* | (2020.01) |
| *H04L 29/08* | (2006.01) |

(52) U.S. Cl.
CPC ............ *G07C 5/008* (2013.01); *B60W 30/06* (2013.01); *B62D 15/0285* (2013.01); *G01S 17/931* (2020.01); *G05D 1/0088* (2013.01); *G05D 2201/0213* (2013.01); *H04L 67/12* (2013.01)

(58) Field of Classification Search
CPC ....... H04L 67/12; B62D 1/00; B62D 15/0285; G05D 1/0088; G05D 2201/0213; G07C 5/008; B60W 30/06; G01S 17/931
USPC .............................................................. 701/2
See application file for complete search history.

(56) References Cited

U.S. PATENT DOCUMENTS

| | | | | |
|---|---|---|---|---|
| 2010/0253543 | A1* | 10/2010 | Szczerba | G06K 9/00805 340/932.2 |
| 2015/0344028 | A1* | 12/2015 | Gieseke | B62D 15/028 701/1 |
| 2016/0223350 | A1* | 8/2016 | Lewis | G05D 1/0278 |
| 2017/0108873 | A1* | 4/2017 | Tanaka | G05D 1/0238 |
| 2017/0229020 | A1* | 8/2017 | Colella | B60W 10/20 |
| 2018/0105208 | A1* | 4/2018 | Kim | G05D 1/0011 |
| 2018/0111610 | A1* | 4/2018 | Romainczyk | B60W 50/14 |
| 2018/0186365 | A1* | 7/2018 | Kim | B60W 30/06 |
| 2018/0339700 | A1* | 11/2018 | Lee | G06K 9/00798 |
| 2019/0016384 | A1* | 1/2019 | Carlson | B60L 53/35 |

(Continued)

*Primary Examiner* — Atul Trivedi
(74) *Attorney, Agent, or Firm* — Morgan, Lewis & Bockius LLP

(57) ABSTRACT

The present disclosure relates to an apparatus for controlling the parking of a vehicle, a system having the same, and a method thereof. The apparatus for controlling parking of a vehicle includes a communication device communicating with a remote controller located inside or outside a vehicle, and a processor receiving information about a surrounding obstacle from a sensor and performing avoidance steering control of the vehicle to avoid collision with the surrounding obstacle, when receiving a vehicle control command from the remote controller.

19 Claims, 12 Drawing Sheets

(56) References Cited

U.S. PATENT DOCUMENTS

| | | | |
|---|---|---|---|
| 2019/0118801 A1* | 4/2019 | Noh | G06K 9/00805 |
| 2019/0184982 A1* | 6/2019 | Latotzki | B62D 15/027 |
| 2019/0232952 A1* | 8/2019 | Kim | B60W 30/06 |
| 2019/0236951 A1* | 8/2019 | Mason | G01C 21/3492 |
| 2019/0283736 A1* | 9/2019 | Watanabe | B60W 30/06 |
| 2020/0031397 A1* | 1/2020 | Hasejima | G08G 1/16 |

* cited by examiner

APPARATUS FOR CONTROLLING PARKING OF VEHICLE, SYSTEM HAVING THE SAME, AND METHOD THEREOF

CROSS-REFERENCE TO RELATED APPLICATION

This application is claims the benefit of priority to Korean Patent Application No. 10-2018-0101227, filed in the Korean Intellectual Property Office on Aug. 28, 2018, the entire contents of which are incorporated herein by reference.

TECHNICAL FIELD

The present disclosure relates to an apparatus for controlling parking a vehicle, a system having the same, and a method thereof, and more particularly a technology for performing obstacle avoidance control during remote forward/reverse control and for aligning the vehicle so as to be spaced apart from an obstacle by a specific distance.

BACKGROUND

A variety of driving assistance systems have been developed and installed in vehicles to improve drivers' convenience and assist drivers to drive vehicles. In particular, a remote smart parking assist system (RSPA) that assists vehicle parking remotely may remotely control the forward/reverse function of a vehicle to control the vehicle to be parked at a parking place or to exit from the parking place.

However, a conventional RSPA performs deceleration control or braking control while maintaining neutral steering because it is impossible to avoid an obstacle, when the obstacle is sensed in the driving direction upon performing the remote forward/reverse function, thereby preventing the collision with the obstacle.

Accordingly, in an obstacle environment, for the purpose of moving a vehicle to the parking space that a driver desires, remote forward/reverse control is possible only in a state of perfectly aligning a vehicle in a parking space.

SUMMARY

The present disclosure has been made to solve the above-mentioned problems occurring in the prior art while advantages achieved by the prior art are maintained intact.

An aspect of the present disclosure provides an apparatus for controlling the parking of a vehicle, a system having the same, and a method thereof that make it possible to perform parking control in a state where a vehicle location is not matched with a parking space direction, avoid an obstacle, and align a vehicle in the parking space by a specific interval at the same time, by determining whether it is possible to avoid an obstacle during remote forward/reverse control, by performing avoidance control when it is possible to avoid an obstacle, and by recognizing a wall or the side surface of a vehicle to control the vehicle so as to be aligned while maintaining a specific spaced distance, thereby reducing the risk of minor collision at the time of parking.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling parking of a vehicle includes a communication device communicating with a remote controller located inside or outside a vehicle, and a processor receiving information about a surrounding obstacle from a sensor and performing avoidance steering control of the vehicle to avoid collision with the surrounding obstacle, when receiving a vehicle control command from the remote controller.

According to an embodiment, the processor is configured to sense an obstacle at a periphery of the vehicle, when receiving a vehicle forward or reverse command from the remote controller.

According to an embodiment, the processor is configured to determine whether the vehicle is currently in an ignition on state, or whether a driving history speed is not less than a predetermined reference value, so as to determine whether the vehicle is in an entrance mode or an exit mode.

According to an embodiment, the processor is configured to determine that the vehicle is in the entrance mode, when the vehicle is currently in the ignition on state and the driving history speed is not less than the predetermined reference value.

According to an embodiment, the processor is configured to determine that the vehicle is in the exit mode, when the vehicle is not currently in the ignition on state, or when the vehicle is started by a command received from the remote controller and the driving history speed is less than the predetermined reference value.

According to an embodiment, the apparatus further includes a storage configured to store the sensed result of the surrounding obstacle.

According to an embodiment, in the entrance mode, the processor is configured to determine whether there is an obstacle in a driving direction of the vehicle and to extract a profile of the obstacle to store the profile of the obstacle in the storage, when the obstacle is present.

According to an embodiment, the processor is configured to determine whether the profile length of the obstacle is greater than a predetermined reference value, when the obstacle is sensed.

According to an embodiment, the processor is configured to align the vehicle in a parking space based on the profile of the obstacle, when the profile length of the obstacle is equal to or greater than the predetermined reference value.

According to an embodiment, the processor is configured to align the vehicle in the parking space so as to be spaced apart from the obstacle by a specific distance, based on the profile of the obstacle, a mean value of a distance between the vehicle and the obstacle and a margin value of the distance between the vehicle and the obstacle.

According to an embodiment, the processor is configured to control the vehicle so as to be aligned in the parking space with respect to a direction angle before the vehicle enters the entrance mode, when the profile length of the obstacle is less than the predetermined reference value.

According to an embodiment, in the exit mode, the processor is configured to compare a feature point of the profile of the obstacle stored in the storage with a feature point of a currently sensed obstacle.

According to an embodiment, the processor is configured to perform avoidance steering control based on the profile of the obstacle, when the feature point of the profile of the obstacle stored in the storage is the same as the feature point of the currently sensed obstacle.

According to an embodiment, the processor is configured to verify a blind spot based on the result obtained by sensing a current obstacle to perform avoidance steering control, when the feature point of the profile of the obstacle stored in the storage is different from the feature point of the currently sensed obstacle.

According to an embodiment, the processor is configured to perform steering neutral control, when receiving a user request to turn off an avoidance steering control function.

According to an embodiment, when receiving a request for termination of a system during the steering neutral control, the processor is configured to determine a slope of a current ground and to control ignition off of the vehicle after electronic parking brake (EPB) is not engaged at 'N' gear, when the slope is less than a predetermined reference value.

According to an embodiment, the processor is configured to control ignition off of the vehicle after the EPB is engaged at 'P' gear, when the slope is not less than the predetermined reference value.

According to an embodiment, the processor is configured to perform the avoidance steering control of the vehicle based on parking line information or based on the parking line information and distance information.

According to an aspect of the present disclosure, a vehicle system includes a remote controller transmitting a command for vehicle control at a remote place, receiving vehicle state information from a vehicle, and displaying the vehicle state information and a vehicle parking controlling apparatus sensing a surrounding obstacle and performing avoidance steering control of the vehicle for avoiding collision with the surrounding obstacle, when receiving a vehicle control command from the remote controller.

According to an aspect of the present disclosure, a method for controlling parking of a vehicle includes sensing a surrounding obstacle to determine whether avoidance steering control for avoiding collision with the surrounding obstacle is possible, when receiving a vehicle control command from a remote controller, determining whether the vehicle is in an entrance mode or an exit mode, when the avoidance steering control is possible, performing alignment control depending on a profile of the surrounding obstacle or a direction angle of the vehicle in the entrance mode, and performing the avoidance steering control based on the profile of the surrounding obstacle or currently sensed information in the exit mode.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
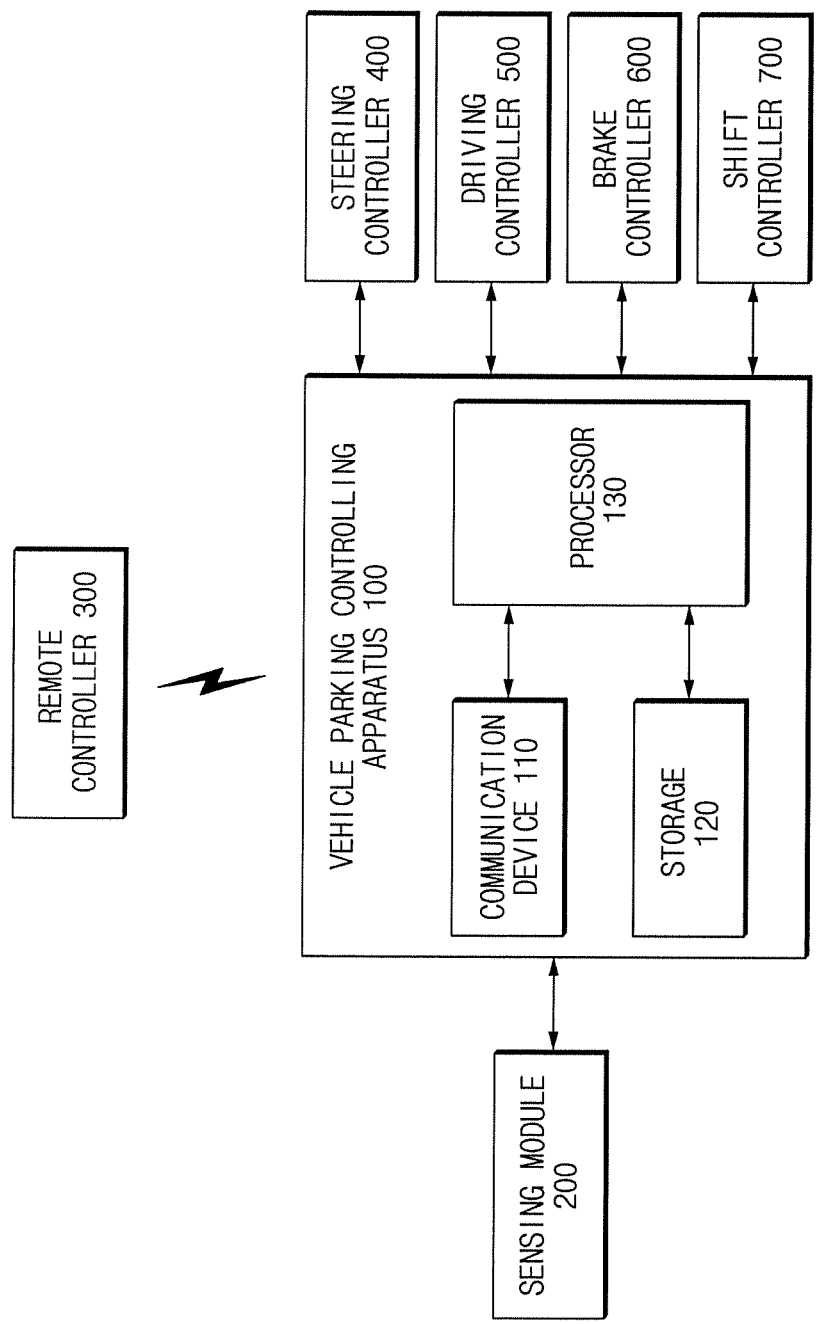
FIG. 1 is a block diagram illustrating a configuration of a vehicle system including a vehicle parking controlling apparatus, according to an embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms first, second, A, B, (a), (b), and the like may be used herein. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which this invention belongs. It will be understood that terms used herein should be interpreted as having a meaning that is consistent with their meaning in the context of the present disclosure and the relevant art and will not be interpreted in an idealized or overly formal sense unless expressly so defined herein.

Below, various embodiments of the present disclosure will be described in detail with reference to FIGS. 1 to 10.

FIG. 1 is a block diagram of a system for controlling the parking of a vehicle, according to an embodiment of the present disclosure.

Referring to FIG. 1, according to an embodiment of the present disclosure, a system for controlling the parking of a vehicle including an apparatus for controlling the parking of a vehicle may include a vehicle parking controlling apparatus 100, a sensing module 200, a remote controller 300, a steering controller 400, a driving controller 500, a brake controller 600, and a shift controller 700. The vehicle parking controlling apparatus 100, the sensing module 200, the steering controller 400, the driving controller 500, the brake controller 600, and the shift controller 700 illustrated in FIG. 1 may be mounted in a vehicle, and the remote controller 300 may wirelessly communicate with the vehicle parking control apparatus 100 inside or outside the vehicle.

The vehicle parking controlling apparatus 100 may sense a surrounding obstacle and may perform the avoidance steering control of the vehicle for avoiding the collision with the surrounding obstacle, when receiving a vehicle control command from the remote controller 300. That is, the vehicle parking controlling apparatus 100 may determine whether it is possible to avoid an obstacle according to vehicle movement, and may control the steering of the vehicle such that the vehicle can come in or go out while avoiding an obstacle, regardless of the current location of the vehicle and the location of the surrounding obstacle during the remote control of the vehicle.

The vehicle parking controlling apparatus 100 may include a communication device 110, storage 120, and a processor 130.

The communication device 110 may be a hardware device implemented with various electronic circuits for transmitting and receiving signals over a wireless or wired connection; in the present disclosure, the communication device 110 may perform communication in a vehicle over CAN communication, LIN communication, or the like and may communicate with the sensing module 200, the steering controller 400, the driving controller 500, the brake controller 600, the shift controller 700, and the like. Furthermore, the communication device 110 may communicate with the remote controller 300 outside a vehicle, over wireless communication.

The storage 120 may store information obtained from the sensing module 200, data (a profile, a feature point, or the like of the surrounding obstacle) obtained by the processor 130, data received from the remote controller 300, or the like. The storage 120 may include at least one type of a storage medium among a flash memory type of a memory, a hard disk type of a memory, a micro type of a memory, and a card type (e.g., a Secure Digital (SD) card or an eXtream Digital (XD) Card) of a memory, a Random Access Memory (RAM) type of a memory, a Static RAM (SRAM) type of a memory, a Read-Only Memory (ROM) type of a memory, a Programmable ROM (PROM) type of a memory, an Electrically Erasable PROM (EEPROM) type of a memory, an Magnetic RAM (MRAM) type of a memory, a magnetic disk type of a memory, and an optical disc type of a memory.

The processor 130 may be electrically connected to the sensing module 200, the steering controller 400, the driving controller 500, the brake controller 600, the shift controller 700, and the like as well as the communication device 110 and the storage 120, may electrically control each of the components, may be an electrical circuit that executes the instructions of the software, and may perform various data processing and calculation described below.

The vehicle parking controlling apparatus 100 may include the communication device 110 communicating with a remote controller located inside or outside a vehicle and the processor 130 that senses a surrounding obstacle and performs avoidance steering control of the vehicle to avoid the collision with the surrounding obstacle when receiving a vehicle control command from the remote controller.

The processor 130 may receive information about obstacles at a periphery of a vehicle sensed by and transmitted from the sensing module 200, when receiving a vehicle forward or reverse command from the remote controller 300.

The processor 130 may receive an on/off signal indicating whether an avoidance steering control button is on or off from the remote controller 300 and may perform an operation for the avoidance steering control when a signal indicating that the avoidance steering control button is on is received by the processor.

That is, the processor 130 may determine whether a vehicle is currently in an ignition on state, or whether a driving history speed is not less than a predetermined reference value, for the avoidance steering control, and then may determine whether the vehicle is in an entrance mode or in an exit mode. At this time, the processor 130 may determine whether a vehicle is in the entrance mode, when a vehicle is currently in the ignition on state and when the driving history speed (e.g., 5 kph) is not less than a predetermined reference value, and/or, the processor 130 may determine whether the vehicle is in the exit mode, when a vehicle is not currently in the ignition on state, or when a vehicle is started remotely by a command received from the remote controller 300 and the driving history speed is less than the predetermined reference value.

In the entrance mode, the processor 130 may determine whether there is an obstacle in the driving direction of the vehicle; the processor 130 may extract the profile of the obstacle to control the storage 120 such that the profile of the obstacle is stored in the storage 120, when the obstacle is present.

The processor 130 may determine whether the profile length of an obstacle is greater than a predetermined reference value, when an obstacle is sensed; the processor 130 may align a vehicle in a parking space based on the profile of the obstacle, when the profile length of the obstacle is greater than the predetermined reference value.

The processor 130 may control the vehicle so as to be aligned in a parking space such that the vehicle is spaced apart from the obstacle by a specific distance based on the profile of the obstacle, a mean value of a distance between the vehicle and the obstacle and a margin value of the distance between the vehicle and the obstacle. Before the vehicle enters the entrance mode, the processor 130 may control the vehicle so as to be aligned in a parking space based on a direction angle, when the profile length of an obstacle is less than the predetermined reference value.

In the exit mode, the processor 130 may compare the feature point the profile of the obstacle stored in the storage 120 with the feature point of the currently sensed obstacle.

The processor 130 may perform the avoidance steering control based on the profile of the obstacle, when the feature point of the profile of the obstacle stored in the storage 120 is the same as the feature point of the currently sensed obstacle. Moreover, the processor 130 may verify a blind spot based on the result of sensing the current obstacle to perform the avoidance steering control, when the feature point of the profile of the obstacle stored in the storage 120 is not the same as the feature point of the currently sensed obstacle.

The processor 130 may determine that a user wants to enter a double parking mode and then may perform steering neutral control, when receiving a signal indicating that the avoidance steering control button is off from the remote controller 300. The processor 130 may determine the current slope of the ground and may allow the ignition to be turned off at 'N' gear after electronic parking brake (EPB) is engaged when the slope is less than a predetermined reference value, when receiving a request for the termination of a system during the steering neutral control. Moreover, the processor 130 may allow the ignition to be turned off at 'P' gear after the EPB is not engaged, when the slope is not less than the predetermined reference value.

The sensing module 200 may scan a parking space, may sense an obstacle (e.g., a vehicle, a pedestrian, a bicycle, or a motorcycle) of the parking space, and may obtain information about the obstacle.

To this end, the sensing module 200 may include a distance measurement sensor (an ultrasonic sensor, radar, or the like), an image sensor (a camera or the like), an acceleration sensor, a yaw rate sensor, a wheel speed sensor, a steering angle sensor, a distance sensor, and the like. At this time, the ultrasonic sensor, the radar, the camera and the like may be mounted on the front, rear, left, and right sides of the vehicle to obtain information about obstacles in front, rear, right, and left of the vehicle. The information about obstacles may include image information of an obstacle, information about the size of an obstacle, information about a distance from an obstacle, information about the profile of an obstacle, information about the feature point of an obstacle, information about the location of an obstacle, information about the speed of an obstacle, information about the acceleration of an obstacle, and the like.

The remote controller 300 may wirelessly communicate with the vehicle parking controlling apparatus 100 to transmit a command such as the forward movement of a vehicle, the reverse movement of a vehicle, door on/off of a vehicle, ignition on/off of a vehicle, or the like to the vehicle parking controlling apparatus 100 remotely. To this end, the remote controller 300 may include a smart key, a user terminal (e.g., a smartphone, a PDA, or the like).

The steering controller 400 may control the steering of a vehicle; the driving controller 500 may control the driving of the vehicle; the brake controller 600 may control the brake of the vehicle; and the shift controller 700 may control the shift of the vehicle. Such the devices 400, 500, 600, and 700 are general in-vehicle devices for performing vehicle parking, and a detailed description thereof will be omitted.

As such, the present disclosure may perform parking in the corresponding space (garage) even in a state where the location of the vehicle does not match the direction of the parking space, when the vehicle enters a narrow space or a space in front of a garage on the remote front/backward control of RSPA. Moreover, the present disclosure may performing obstacle avoidance control or may align a vehicle so as to be spaced apart from an obstacle by a specific interval in a parking space, thereby minimizing the risk of minor collision at the time of parking.

Figure 2A:
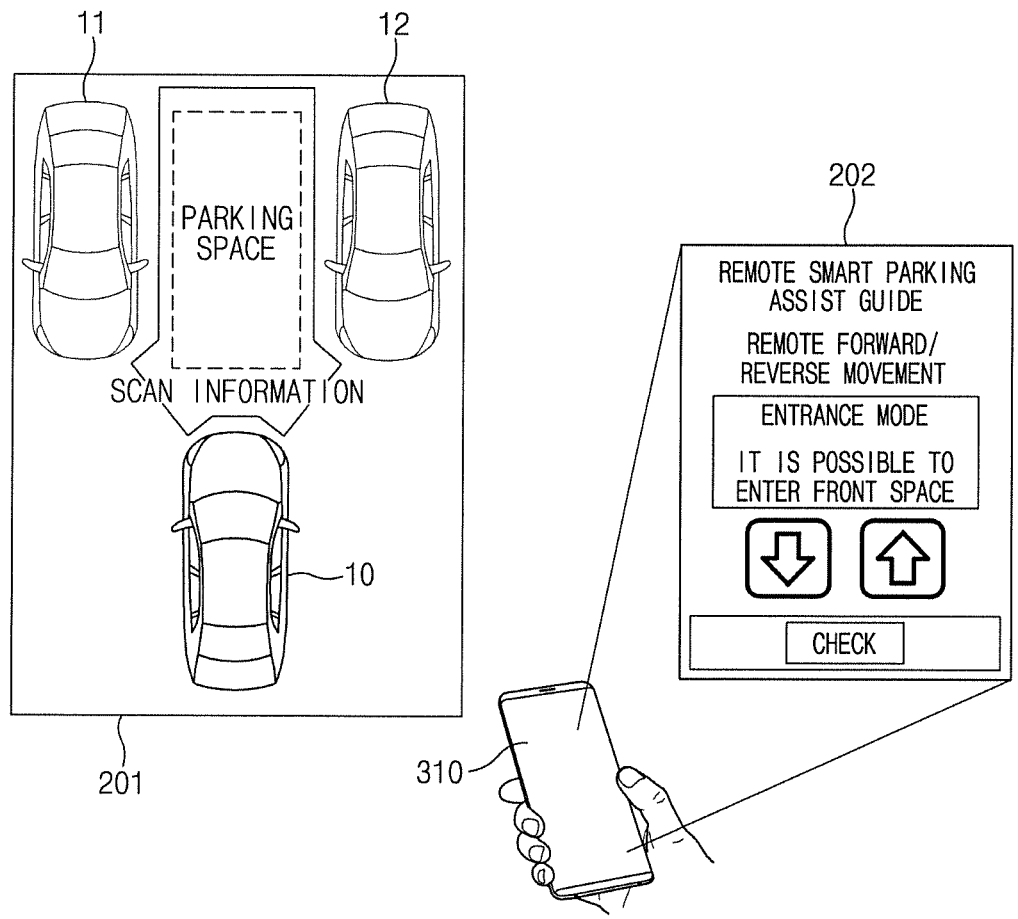
FIG. 2A is an exemplary view of an operation of notifying a remote controller that it is possible to enter a space, according to an embodiment of the present disclosure.
Figure 2B:
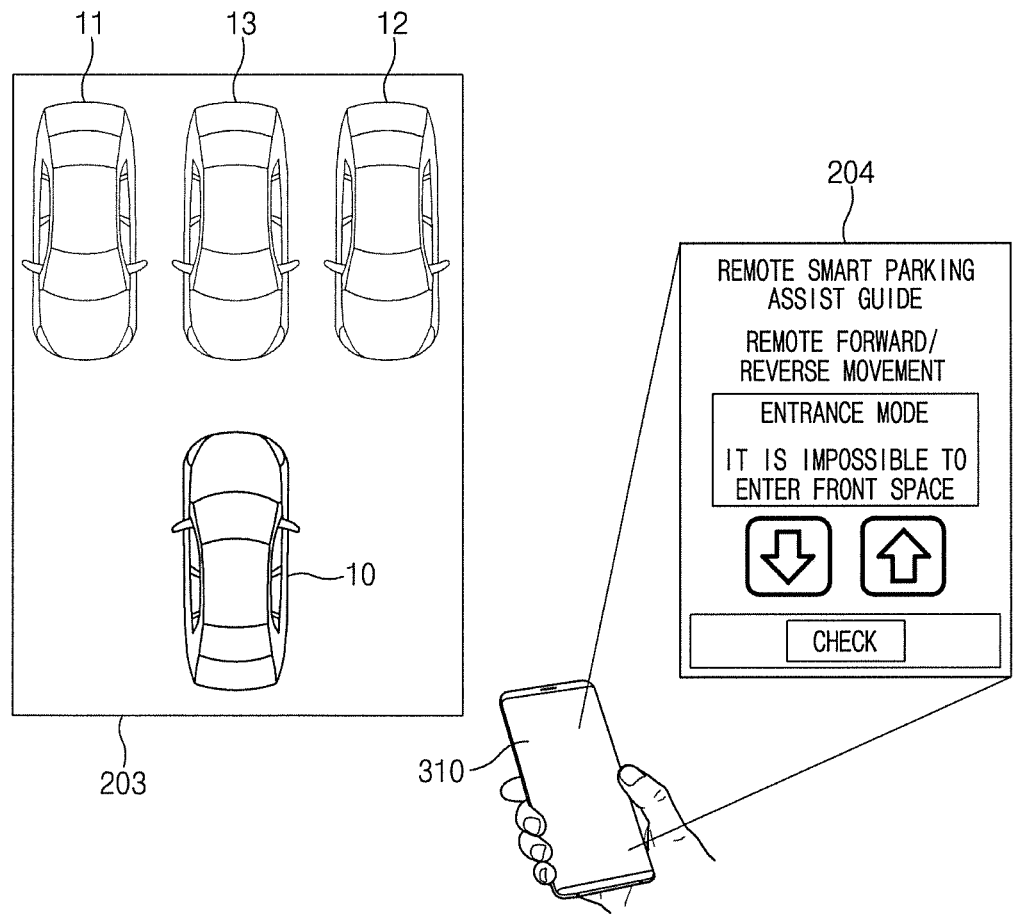
FIG. 2B is an exemplary view of an operation of notifying a remote controller that it is impossible to enter a space, according to an embodiment of the present disclosure.
Figure 2C:
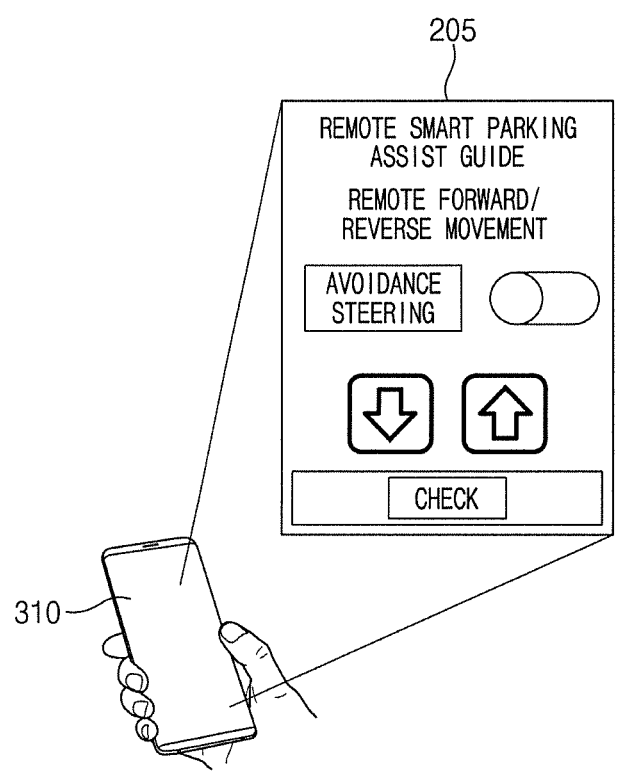
FIG. 2C is an exemplary view of a state where an avoidance steering button of a remote controller is turned on, according to an embodiment of the present disclosure.

FIG. 2A is an exemplary view of an operation of notifying a remote controller that it is possible to enter a space, according to an embodiment of the present disclosure. FIG. 2B is an exemplary view of an operation of notifying a remote controller that it is impossible to enter a space, according to an embodiment of the present disclosure. FIG. 2C is an exemplary view of a state where an avoidance steering button of a remote controller is turned on, according to an embodiment of the present disclosure.

Referring to '201' of FIG. 2A, the vehicle parking control apparatus 100 scans a parking space through the sensing module 200 when receiving a remote forward/reverse command signal from the remote controller 300; as illustrated in '202', the vehicle parking control apparatus 100 may notify a user terminal 310 being a remote controller that it is possible to enter the scanned parking space, when it is possible to enter the scanned parking space.

Referring to '203' of FIG. 2B, the vehicle parking control apparatus 100 scans a parking space through the sensing module 200 when a remote forward/reverse command signal is received from the remote controller 300; as illustrated in '204', the vehicle parking control apparatus 100 notifies the user terminal 310 being a remote controller that it is impossible to enter a parking space, when failing to find the parking space because all vehicles are parked in the parking spaces as illustrated in '203' or when it is impossible to enter a parking space.

FIG. 2C is an exemplary view of a screen in which an on/off signal of an avoidance steering button is received through the user terminal 310. As illustrated in '205' of FIG. 2C, the vehicle parking control apparatus 100 may directly receive an on/off signal of an avoidance steering button through the user terminal 310 and the user terminal 310 (a remote controller) may transmit an avoidance steering button on signal or an avoidance steering button off signal to a vehicle system, when the avoidance steering button is turned on or off by a user.

Figure 3:
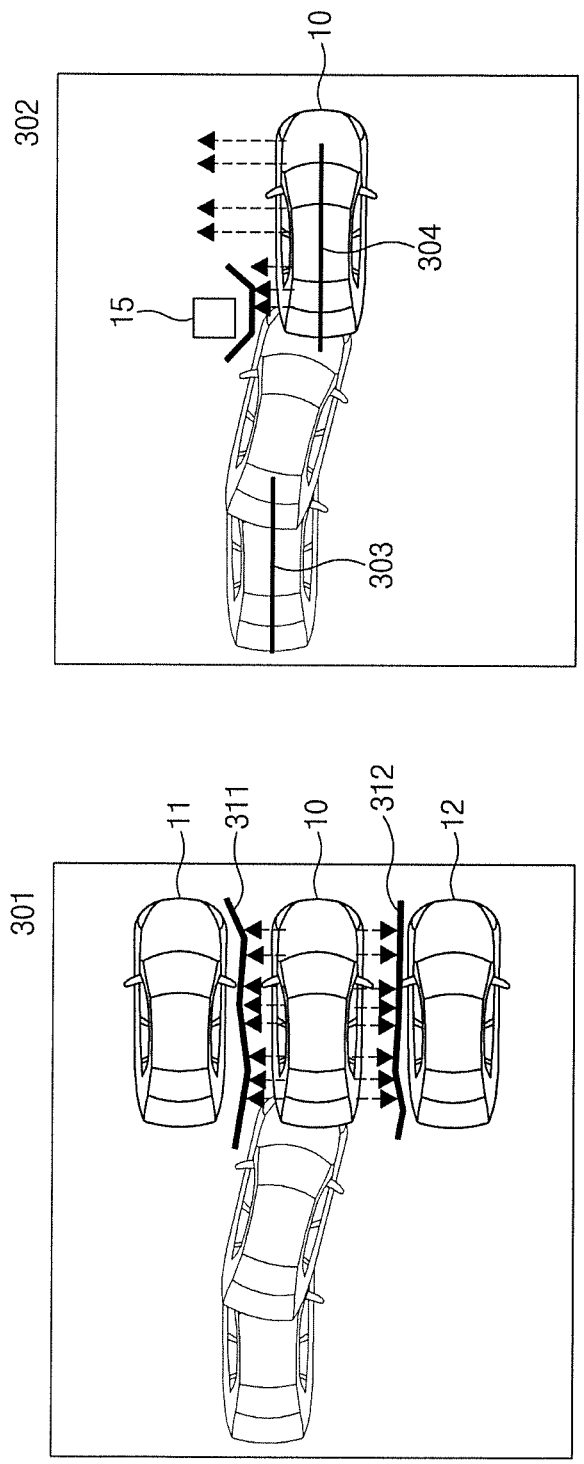
FIG. 3 is a view for describing a vehicle alignment controlling method of a vehicle parking controlling apparatus in an entrance mode, according to an embodiment of the present disclosure.

FIG. 3 is a view for describing a vehicle alignment controlling method of a vehicle parking controlling apparatus in an entrance mode, according to an embodiment of the present disclosure.

Referring to '301' of FIG. 3, it is described that the vehicle parking control apparatus 100 scans a parking space through the sensing module 200, aligns a vehicle 10 (which is equipped with or coupled with at least the elements described with reference to FIG. 1) such that a distance between the vehicle 10 and the profiles 311 and 312 is constant based on left and right profiles 311 and 312 of left and right vehicles 11 and 12, and parks the vehicle 10 when a remote forward/reverse command signal is received from the remote controller 300. At this time, the vehicle parking control apparatus 100 may extract a profile by extracting angles of the left and right vehicles 11 and 12 and the distances between the vehicle 10 and the left and right vehicles 11 and 12 and may align the vehicle 10 based on a value obtained by adding the mean value of the profile and the margin of the profile. At this time, each of the profiles 311 and 312 may be used as a profile when each of the profiles 311 and 312 is greater than a predetermined reference value.

Referring to '302', it is difficult to extract the angle profile of the side of the obstacle when the profile for an obstacle 15 with a short length such as a column or a cone is short; it is difficult to use a profile being a reference for vehicle alignment. In this case, a vehicle may be aligned by setting a direction angle 304 of the vehicle at the time of parking so as to be the same as an initial direction angle 303 of the vehicle.

Figure 4:
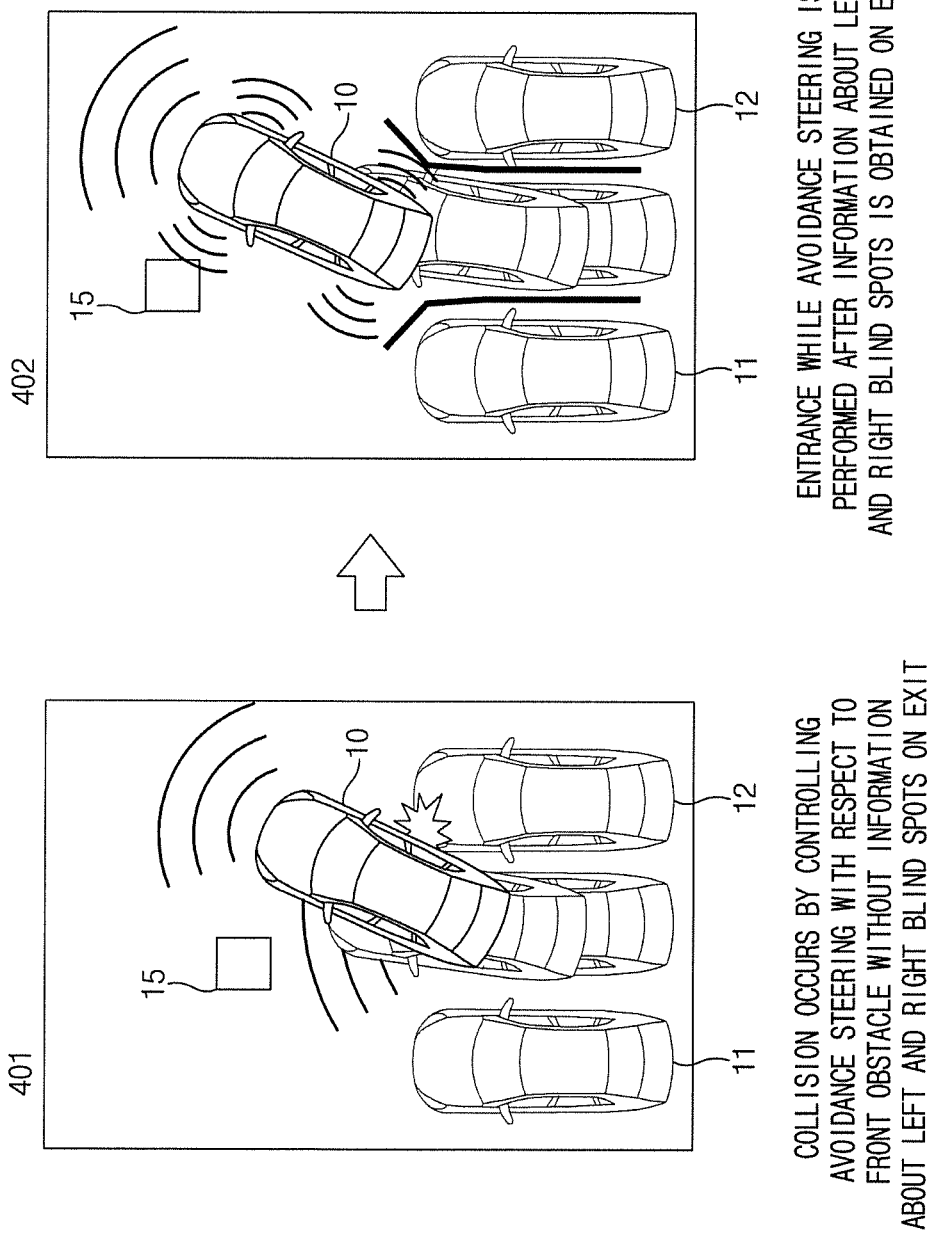
FIG. 4 a view for describing a method of controlling avoidance steering based on sensor information in an exit mode of a vehicle parking controlling apparatus, according to an embodiment of the present disclosure.

FIG. 4 a view for describing a method of controlling avoidance steering based on sensor information in an exit mode of a vehicle parking controlling apparatus, according to an embodiment of the present disclosure.

Referring to FIG. 4, in the exit mode of a vehicle, the vehicle parking control apparatus 100 senses a surrounding obstacle by using the sensing module 200 mounted in the vehicle and performs avoidance steering. '401' of FIG. 4 illustrates that the collision occurs by controlling the avoidance steering with respect to the front obstacle 15 without verifying the information about the left and right blind spots on exit. In '402' of FIG. 4, the vehicle parking control apparatus 100 may allow a vehicle so as to avoid the front obstacle 15 as well as the vehicles 11 and 12 located next to the vehicle 10 by obtaining information about left and right blind spots on exit to recognize the obstacle 15.

Figure 5:
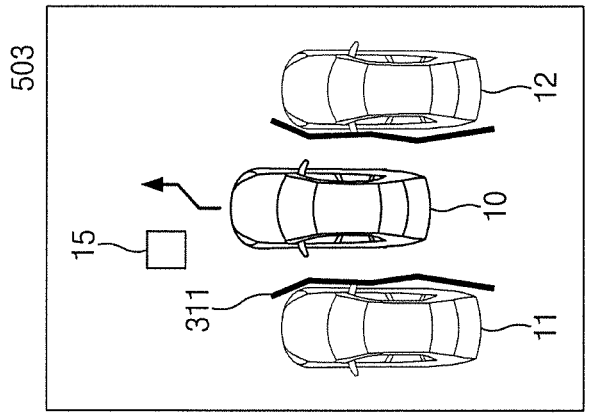
FIG. 5 is a view for describing a profile-based avoidance steering controlling method of a vehicle parking controlling apparatus in an exit mode, according to an embodiment of the present disclosure.
Figure 5:
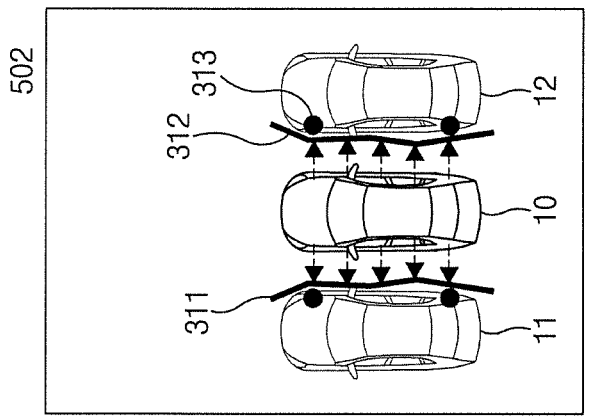
Figure 5:
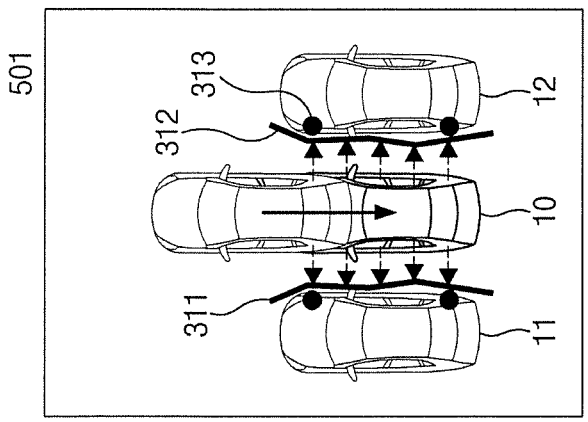

FIG. 5 is a view for describing a profile-based avoidance steering controlling method of a vehicle parking controlling apparatus in an exit mode, according to an embodiment of the present disclosure.

In '501' of FIG. 5, the vehicle parking control apparatus 100 may extract the left and right feature points of the surrounding obstacles 11 and 12, may connect the feature points, may extract the profiles 311 and 312, and may store the profiles 311 and 312, when the vehicle 10 enters a parking space between the surrounding obstacles 11 and 12.

In '502' of FIG. 5, in the exit mode, the vehicle parking control apparatus 100 may compare the stored profile with the feature point sensed by the sensing module 200 of the vehicle 10; the vehicle parking control apparatus 100 may determine that there is an obstacle as it is on entrance, and then may control exit control based on the stored profile, when the stored profile is similar to the feature point. At this time, as illustrated in '503' of FIG. 5, the vehicle parking control apparatus 100 may perform the steering control to avoid the obstacle 15, when the obstacle 15 is sensed.

Figure 6:
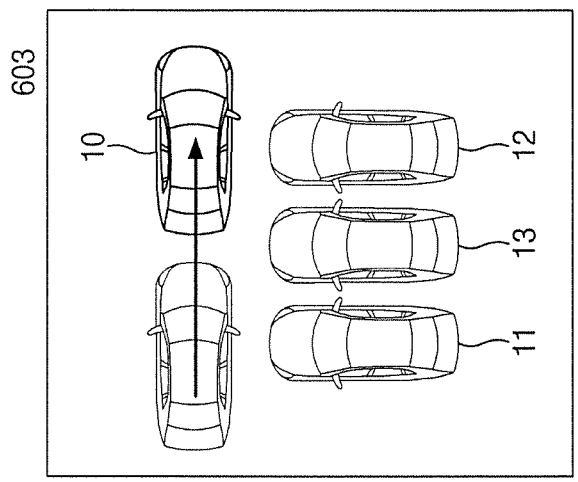
FIG. 6 is an exemplary view of a parking situation for describing avoidance steering control, according to an embodiment of the present disclosure.
Figure 6:
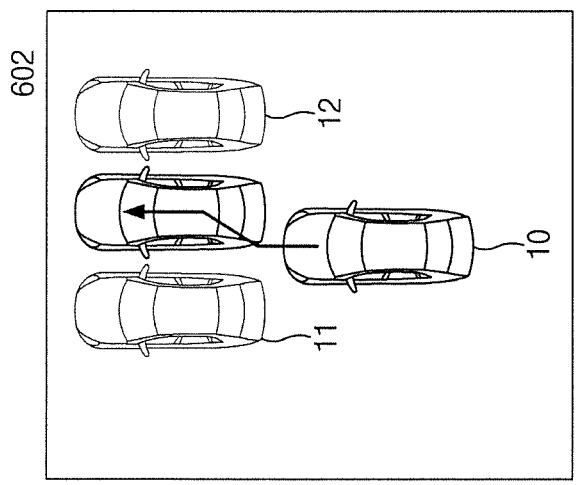
Figure 6:
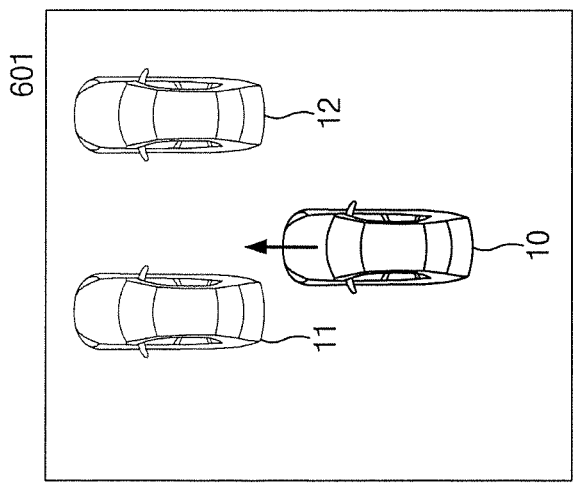

FIG. 6 is an exemplary view of a parking situation for describing avoidance steering control, according to an embodiment of the present disclosure.

'601' of FIG. 6 illustrates that the vehicle 10 may collide with the front obstacle 11 when the vehicle 10 enters a parking space; '602' of FIG. 6 illustrates that the vehicle 10 is parked in a parking space after avoiding the obstacle 11 through avoidance steering control. '603' of FIG. 6 illustrates that double parking is performed when an empty parking space is not scanned because all the obstacles 11, 12, and 13 is parked in the parking space.

Figure 7:
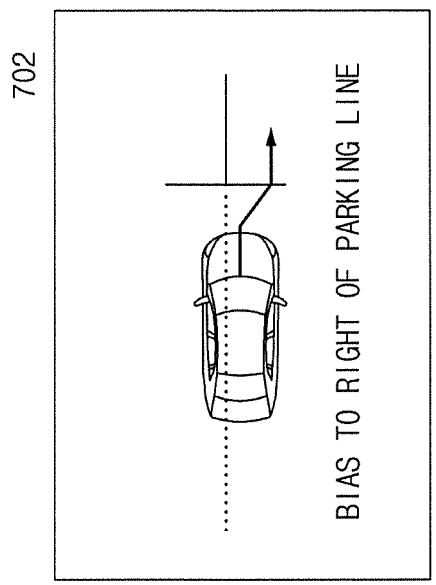
FIG. 7 is a view for describing a parking line-based alignment controlling method, according to an embodiment of the present disclosure.
Figure 7:
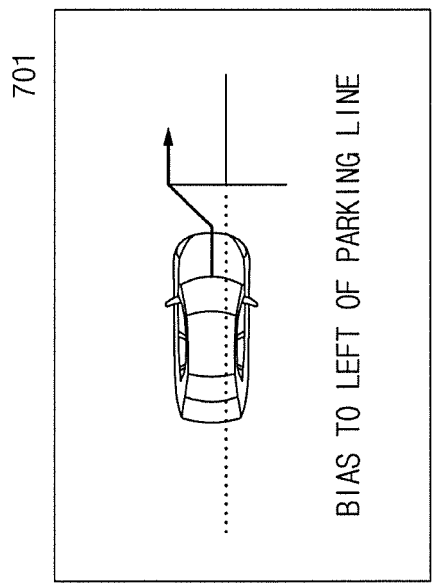

FIG. 7 is a view for describing a parking line-based alignment controlling method, according to an embodiment of the present disclosure.

FIG. 7 illustrates that an alignment reference is provided with respect to parking line information when only a parking line is present, when parking control is performed in a parking space based on image data of a camera as well as a distance information sensor (radar, ultrasonic sensor, or the like). That is, a vehicle may enter the left or right space after determining whether to enter the left or right space, depending on the amount to which a vehicle is biased with respect to the cross point of parking lines. '701' of FIG. 7 illustrates avoidance steering in a state where a vehicle is biased to the left with respect to the parking line; and '702' of FIG. 7 illustrates avoidance steering in a state where a vehicle is biased to the right with respect to the parking line.

Figure 8:
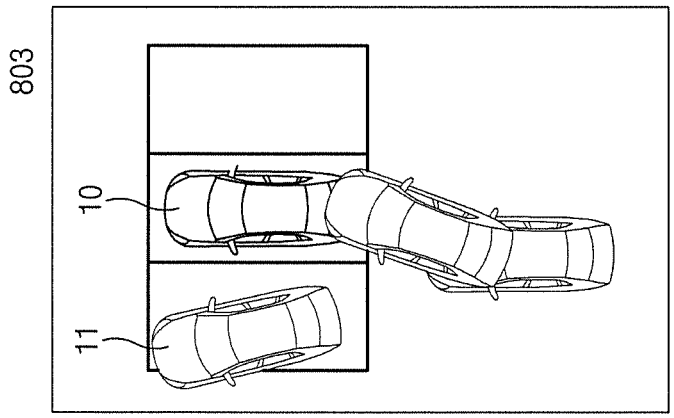
FIG. 8 is a view for describing an alignment controlling method based on a parking line and a vehicle next to a parking line, according to an embodiment of the present disclosure.
Figure 8:
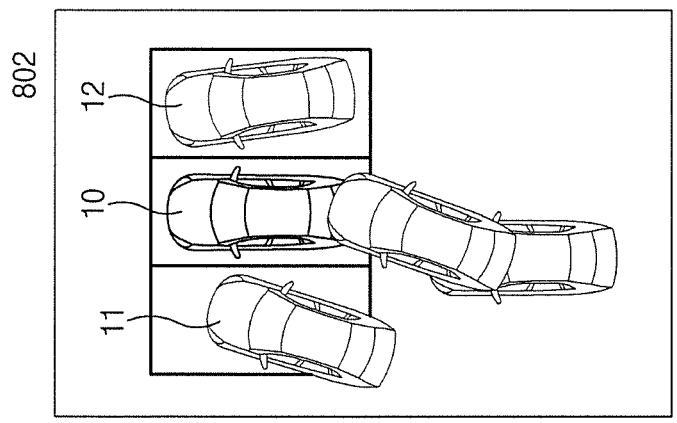
Figure 8:
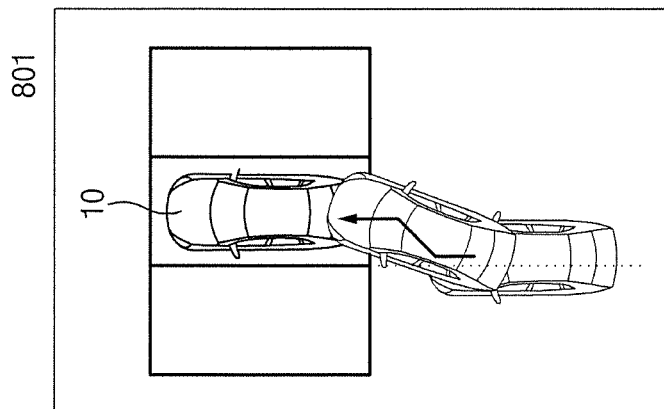

FIG. 8 is a view for describing an alignment controlling method based on a parking line and a vehicle next to a parking line, according to an embodiment of the present disclosure. Referring to FIG. 8, it is illustrated that avoidance steering control is performed based on a parking line and a surrounding obstacle. '801' of FIG. 8 illustrates that alignment is performed with respect to a left parking line when there is no surrounding obstacle; and '802' of FIG. 8 illustrates that parking alignment is performed based on the parking line and a distance between the vehicle and the surrounding obstacles 11 and 12 when the surrounding obstacles 11 and 12 are present and the surrounding obstacles 11 and 12 are parked to cross the parking line. '803' of FIG. 8 illustrates that parking alignment is performed based on the parking line and a distance between the vehicle and the surrounding obstacle 11, when the surrounding obstacle 11 is parked in only one of the left and right parking spaces. At this time, the vehicle parking controlling apparatus 100 may allow a vehicle so as to be aligned in the center of the parking line with respect to the parking line, when there is no surrounding vehicle crossing the parking line.

Figure 9:
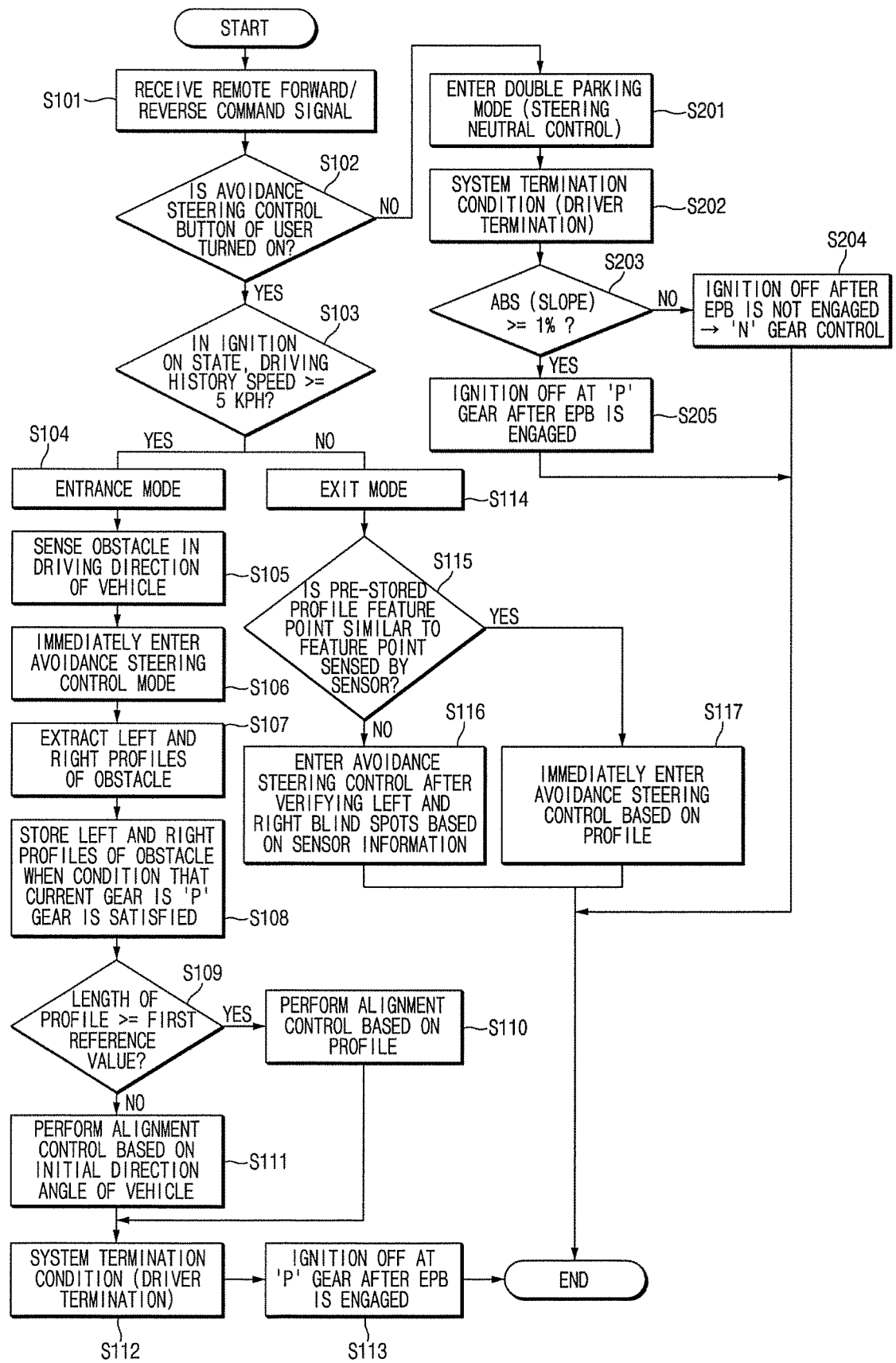
FIG. 9 is a flowchart for describing a method for controlling parking of a vehicle, according to an embodiment of the present disclosure.

Hereinafter, according to an embodiment of the present disclosure, a method for controlling the parking of a vehicle will be described in detail with reference to FIG. 9. FIG. 9 is a flowchart for describing a method for controlling parking of a vehicle, according to an embodiment of the present disclosure.

Hereinafter, it is assumed that the vehicle parking controlling apparatus 100 of FIG. 1 performs the process of FIG. 9. In addition, as described in FIG. 9, it is understood that the operation described as being executed by the vehicle parking controlling apparatus 100 is controlled by the processor 130 of the apparatus 100.

Referring to FIG. 9, in operation S102, the vehicle parking controlling apparatus 100 determines whether an avoidance steerable button off signal is received from the remote controller 300 of a user, when receiving a remote forward/reverse button input signal in operation S101. At this time, as illustrated in FIG. 2C, the user may turn off an avoidance steerable button of the remote controller 300 for simple forward/reverse remote control in a double parking situation, not an entry/exit condition.

In operation S103, the vehicle parking controlling apparatus 100 determines whether a vehicle is currently in an ignition on state, or whether a driving history speed is not less than a predetermined reference speed (e.g., 5 kph), to determine whether to be in an entrance mode or an exit mode, when the vehicle parking controlling apparatus 100 receives a signal indicating that an avoidance steerable switch is on from the remote controller 300 of the user.

At this time, the vehicle parking controlling apparatus 100 determines that the vehicle is in the entrance mode in operation S104, senses an obstacle in the driving direction of the vehicle in operation S105, and immediately enters an avoidance steering control mode in operation S106 when an obstacle is sensed, when a vehicle is currently in an ignition on state and when the driving history speed is not less than the predetermined reference speed.

Then, the vehicle parking controlling apparatus 100 extracts left and right profiles of the sensed obstacle in operation S107 and stores the extracted left and right profiles of the obstacle in operation S108, when the current gear of the vehicle is located at 'P' gear. At this time, operation S108 may be performed when parking control is completed and a system termination condition is satisfied.

Afterwards, the vehicle parking controlling apparatus 100 determines whether a length of each of the left and right profiles of an obstacle is not less than a predetermined first reference value in operation S109, and performs parking alignment control based on the profiles in operation S110 when the length of each of the left and right profiles of the obstacle is not less than the predetermined first reference value. As illustrated in '301' of FIG. 3, a vehicle may be aligned to be spaced apart from the profile 311 of the left obstacle 11 and the profile 312 of the right obstacle 12 by a specific interval. At this time, the vehicle parking controlling apparatus 100 may align the vehicle 10 so as to be spaced based on a value obtained by adding a mean value of a distance between the vehicle 10 and the profiles 311 and 312 of an obstacle and a specific margin value of the distance.

In operation S111, the vehicle parking controlling apparatus 100 may align a vehicle based on the initial direction angle of the vehicle when the length of each of the left and right profiles of an obstacle is less than the predetermined first reference value. As illustrated in '302' of FIG. 3, it is difficult to align the vehicle by using the corresponding profile, when the profile of an obstacle is shorter than the predetermined first reference value. In this case, a vehicle may be aligned depending on the reference lines 303 and 304 of the initial direction angle (a heading angle) in the entrance mode.

Afterwards, in operation S113, the vehicle parking controlling apparatus 100 may turn off ignition at 'P' gear after EPB is engaged, when satisfying a system termination condition in operation S112. At this time, the system termination condition may include the case where parking is completed in the entrance mode.

In the meantime, in operation S114, the vehicle parking controlling apparatus 100 determines that the vehicle is parked and then goes out to determine that the vehicle is in the exit mode, when the ignition is remotely turned on and the driving history speed is less than the predetermined reference speed in operation S103.

Then, in operation S115, the vehicle parking controlling apparatus 100 determines whether the pre-stored profile feature point is similar to (or the same as) the feature point sensed by a sensor. At this time, the pre-stored profile feature point may include the pre-stored profile information in the entrance mode; and the feature point sensed by the sensor may include the feature point information of an obstacle sensed by the sensing module 200 at a current time point.

Since an obstacle sensed in the entrance mode is different from an obstacle at the current time point when the stored profile feature point is not similar to the feature point sensed by the sensor in operation S115, in operation S116, the vehicle parking controlling apparatus 100 performs avoidance steering control such that a vehicle goes out after verifying left and right blind spots based on sensor information sensed at the current time point. As illustrated in '402' of FIG. 4, after sensing a surrounding obstacle to verify information about left and right blind spots, the sensing module 200 of a vehicle enters an avoidance steering control mode. At this time, for the purpose of verifying the information about left and right blind spots, the vehicle 10 may be moved to a location, at which an ultrasonic sensor of a vehicle is capable of sensing, by a specific distance.

In operation S115, the vehicle parking controlling apparatus 100 determines that the obstacle sensed in the entrance mode is present, and, in operation S117, performs avoidance steering control such that a vehicle goes out, based on a profile, when the pre-stored profile feature point is similar to the feature point sensed by a sensor. As illustrated in '501' to '503' of FIG. 5, the avoidance steering control may be performed based on the profiles 311 and 313.

In operation S201, the vehicle parking controlling apparatus 100 enters a double parking mode (steering neutral control) when a user desires double parking, when a signal indicating that the avoidance steering control is off is received from the remote controller 300 in operation S102.

Afterwards, in operation S203, the vehicle parking controlling apparatus 100 determines whether the current slope is greater than a predetermined reference value, when the system to urination condition is satisfied; in operation S204, the vehicle parking controlling apparatus 100 performs ignition off ('N' gear control) after the EPB is not engaged, when the current slope is less than the predetermined reference value; in operation S205, the vehicle parking controlling apparatus 100 perform ignition off at 'P' gear after the EPB is engaged, when the current slope is equal to or greater than the predetermined reference value. That is, for convenience at the time of double parking, the ignition of a vehicle is turned off at 'N' gear after the EPB is not engaged, when the slope is small (flat); the vehicle may be pushed when the slope is equal to or greater than a reference value. To prevent this, the ignition is turned off at 'P' gear after the EPB is engaged.

As such, the present disclosure may safely assist parking by performing steering avoidance control, even when the driving direction and the location of the vehicle do not match the direction of the parking space during parking assistance of the RSPA. In addition, the present disclosure may control a vehicle so as to be aligned in the parking space at a specific interval by avoiding an obstacle, thereby reducing the risk of minor collision with surrounding vehicles when the vehicle is parked or goes out.

Figure 10:
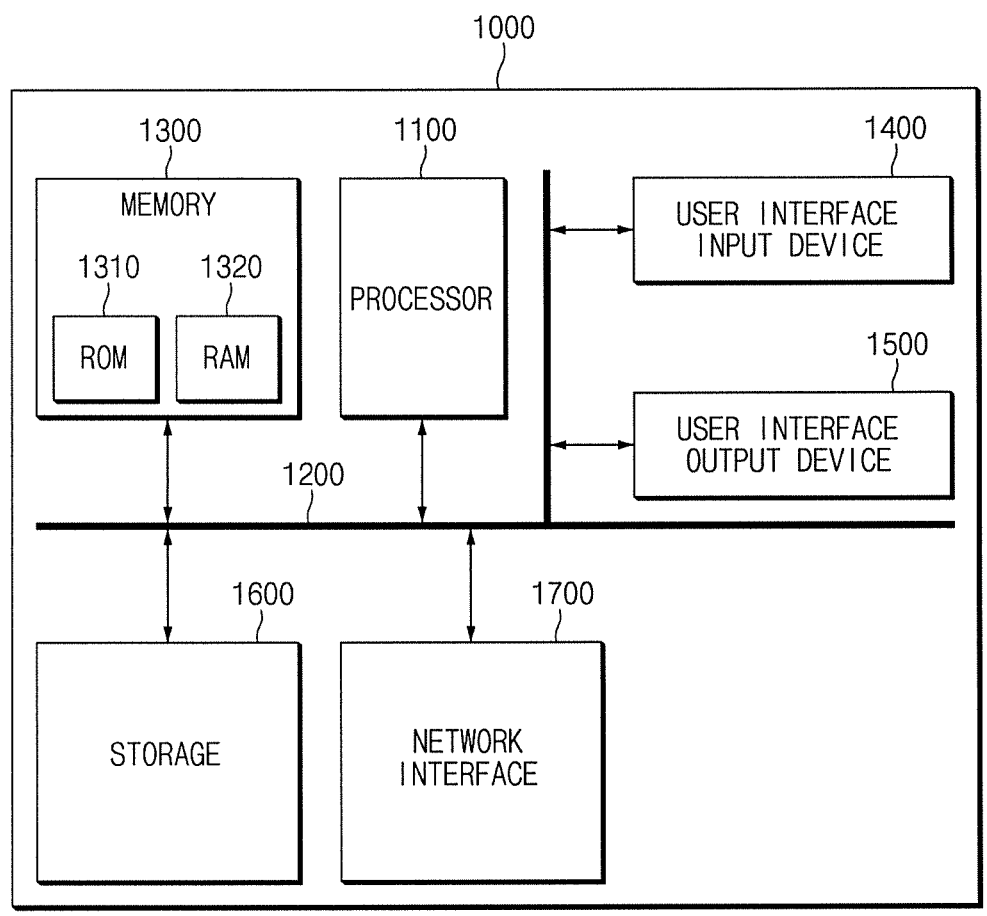
FIG. 10 illustrates a computing system according to an embodiment of the present disclosure.

FIG. 10 illustrates a computing system according to an embodiment of the present disclosure.

Referring to FIG. 10, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or a combination of the hardware module and the software module, which is executed by the processor 1100. The software module may reside on a non-transitory, or transitory, storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may be implemented with separate components in the user terminal.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

The present disclosure may determine whether to avoid an obstacle during remote forward/reverse control, may perform avoidance control when it is possible to avoid an obstacle, and may recognize a wall or the side surface of a vehicle to allow a vehicle to be aligned while maintaining a specific spaced distance; and thus, the present disclosure may be capable of controlling the parking when a vehicle location does not match a parking space direction, may avoid an obstacle, and may align a vehicle in a parking space at a specific interval, thereby reducing the risk of minor collision at the time of parking.

Besides, a variety of effects directly or indirectly understood through this disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling parking of a vehicle, the apparatus comprising:
    a communication device configured to communicate with a remote controller located inside or outside a vehicle; and
    a processor configured to:
        receive information about a surrounding obstacle from a sensor and configured to perform avoidance steering control of the vehicle to avoid collision with the surrounding obstacle, when receiving a vehicle control command from the remote controller,
        determine whether there is an obstacle in a driving direction of the vehicle, and
        when the obstacle is present, extract a profile of the obstacle to store the profile of the obstacle in a storage.

2. The apparatus of claim 1, wherein the processor is further configured to:
    sense an obstacle at a periphery of the vehicle, when receiving a vehicle forward or reverse command from the remote controller.

3. The apparatus of claim 2, wherein the processor is further configured to:
    determine whether the vehicle is currently in an ignition on state, or whether a driving history speed is not less than a predetermined reference value, so as to determine whether the vehicle is in an entrance mode or an exit mode.

4. The apparatus of claim 3, wherein the processor is further configured to:
    determine that the vehicle is in the entrance mode, when the vehicle is currently in the ignition on state and the driving history speed is not less than the predetermined reference value.

5. The apparatus of claim 3, wherein the processor is further configured to:
    determine that the vehicle is in the exit mode, when the vehicle is not currently in the ignition on state, or when the vehicle is started by a command received from the remote controller and the driving history speed is less than the predetermined reference value.

6. The apparatus of claim 3, wherein the storage is configured to store the sensed result of the surrounding obstacle.

7. The apparatus of claim 2, wherein the processor is further configured to:
    perform steering neutral control, when receiving a user request to turn off an avoidance steering control function.

8. The apparatus of claim 7, wherein the processor is further configured to:
    when receiving a request for termination of a system during the steering neutral control,
    determine a slope of a current ground; and
    control ignition off of the vehicle after electronic parking brake (EPB) is not engaged at 'N' gear, when the slope is less than a predetermined reference value.

9. The apparatus of claim 8, wherein the processor is configured to:
    control ignition off of the vehicle after the EPB is engaged at 'P' gear, when the slope is not less than the predetermined reference value.

10. The apparatus of claim 1, wherein the processor is further configured to:
    determine whether the profile length of the obstacle is greater than a predetermined reference value, when the obstacle is sensed.

11. The apparatus of claim 10, wherein the processor is configured to:
    align the vehicle in a parking space based on the profile of the obstacle, when the profile length of the obstacle is equal to or greater than the predetermined reference value.

12. The apparatus of claim 11, wherein the processor is configured to:
    align the vehicle in the parking space so as to be spaced apart from the obstacle by a specific distance, based on the profile of the obstacle, a mean value of a distance between the vehicle and the obstacle and a margin value of the distance between the vehicle and the obstacle.

13. The apparatus of claim 10, wherein the processor is further configured to:
    control the vehicle so as to be aligned in the parking space with respect to a direction angle before the vehicle enters the entrance mode, when the profile length of the obstacle is less than the predetermined reference value.

14. The apparatus of claim 1, wherein the processor is further configured to:
    in the exit mode, compare a feature point of the profile of the obstacle stored in the storage with a feature point of a currently sensed obstacle.

15. The apparatus of claim 14, wherein the processor is configured to:
    perform avoidance steering control based on the profile of the obstacle, when the feature point of the profile of the obstacle stored in the storage is the same as the feature point of the currently sensed obstacle.

16. The apparatus of claim 14, wherein the processor is further configured to:
    verify a blind spot based on the result obtained by sensing a current obstacle to perform avoidance steering control, when the feature point of the profile of the obstacle stored in the storage is different from the feature point of the currently sensed obstacle.

17. The apparatus of claim 1, wherein the processor is configured to:
    perform the avoidance steering control of the vehicle based on parking line information or based on the parking line information and distance information.

18. A vehicle system comprising:
    a remote controller configured to transmit a command for vehicle control at a remote place, configured to receive vehicle state information from a vehicle, and configured to display the vehicle state information; and
    a vehicle parking controlling apparatus configured to:
        sense a surrounding obstacle and configured to perform avoidance steering control of the vehicle for avoiding collision with the surrounding obstacle, when receiving a vehicle control command from the remote controller, determine whether there is an obstacle in a driving direction of the vehicle, and when the obstacle is present, extract a profile of the obstacle to store the profile of the obstacle in a storage.

19. A method for controlling parking of a vehicle, the method comprising:

sensing a surrounding obstacle to determine whether avoidance steering control for avoiding collision with the surrounding obstacle is possible, when receiving a vehicle control command from a remote controller;

determining whether the vehicle is in an entrance mode or an exit mode, when the avoidance steering control is possible;

determining whether there is an obstacle in a driving direction of the vehicle;

when the obstacle is present, in the entrance mode, extracting a profile of the obstacle to store the profile of the obstacle;

performing alignment control depending on a profile of the surrounding obstacle or a direction angle of the vehicle in the entrance mode; and performing the avoidance steering control based on the profile of the surrounding obstacle or currently sensed information in the exit mode.

* * * * *